US012790955B2

(12) United States Patent
Consiglio et al.

(10) Patent No.: US 12,790,955 B2
(45) Date of Patent: Nov. 10, 2026

(54) IN-FLIGHT EMISSIONS AND CONTRAIL CONTROL SYSTEM

(71) Applicant: RTX Corporation, Farmington, CT (US)

(72) Inventors: Andrew A. Consiglio, Woodbury, CT (US); Charles W. Haldeman, Simsbury, CT (US); John R. Farris, Lebanon, CT (US); Jorn A. Glahn, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 292 days.

(21) Appl. No.: 18/486,535

(22) Filed: Oct. 13, 2023

(65) Prior Publication Data

US 2025/0122811 A1 Apr. 17, 2025

(51) Int. Cl.
*F01D 21/00* (2006.01)
*F01D 17/08* (2006.01)

(52) U.S. Cl.
CPC .......... *F01D 21/003* (2013.01); *F01D 17/08* (2013.01); *F05D 2260/80* (2013.01)

(58) Field of Classification Search
CPC ... F01D 21/003; F01D 17/08; G01N 15/0205; G01N 15/075; G01N 15/1459; G01S 17/58; G01S 17/88; B64D 47/08; F02C 9/28; F02C 9/16
See application file for complete search history.

(56) References Cited

U.S. PATENT DOCUMENTS

| | | | | |
|---|---|---|---|---|
| 5,285,256 | A | 2/1994 | Nelson et al. | |
| 5,546,183 | A | 8/1996 | Fegley et al. | |
| 2013/0087708 | A1 | 4/2013 | Tillotson | |
| 2014/0075954 | A1 | 3/2014 | Tralshawala et al. | |
| 2015/0284102 | A1 | 10/2015 | Swann | |
| 2022/0332430 | A1 | 10/2022 | Hiller | |
| 2023/0013891 | A1 | 1/2023 | Lowe et al. | |
| 2023/0193777 | A1 * | 6/2023 | Swann ..................... | F02C 9/28 415/118 |

FOREIGN PATENT DOCUMENTS

EP 4497323 A1 1/2025

OTHER PUBLICATIONS

Search Report issued in European Patent Application No. 24206402.0; Date of Mailing Mar. 12, 2025 (9 pages).

* cited by examiner

*Primary Examiner* — David Z Huang
(74) *Attorney, Agent, or Firm* — CANTOR COLBURN LLP

(57) ABSTRACT

An aircraft includes a gas turbine engine and an optically-based contrail control system. The gas turbine engine is configured to ingest a first mass flow and to exhaust a second mass flow. The optically-based contrail control system is configured to determine an amount of scattered energy contained in the second mass flow and to determine flow characteristics of the second mass flow based at least in part on molecular components contained in the second mass flow. The optically-based contrail control system determines a level of emissions exhausted from the gas turbine engine based at least in part on a combination of the amount of scattered energy and the flow characteristics.

18 Claims, 3 Drawing Sheets

IN-FLIGHT EMISSIONS AND CONTRAIL CONTROL SYSTEM

BACKGROUND

The subject matter disclosed herein generally relates to aircraft engines, and more particularly, to in-flight emissions and contrail formation control.

Jet engine exhaust emissions have been identified as a source of pollution and contribute to rise in greenhouse gases. In particular, aircraft contrails have been identified as an important contributor to global climate change. Contrails form when exhaust gases locally exceed the water saturation limit while mixing and cooling to ambient conditions. However, recent research has shown that only approximately 20% of flights globally produce contrails, and furthermore, that less than 10% of flights account for 80% of the global climate warming from contrails. Studies have shown that contrails both trap outgoing radiation from the earth and reflect incoming radiation from the sun. On a global basis, contrails have been found to have a net warming impact, meaning that they trap more energy than they reflect, but each individual contrail is different.

SUMMARY

According to a non-limiting embodiment, an aircraft includes a gas turbine engine and an optically-based contrail control system. The gas turbine engine is configured to ingest a first mass flow and to exhaust a second mass flow. The optically-based contrail control system is configured to determine an amount of scattered energy contained in the second mass flow and to determine flow characteristics of the second mass flow based at least in part on molecular components contained in the second mass flow. The optically-based contrail control system determines a level of emissions exhausted from the gas turbine engine based at least in part on a combination of the amount of scattered energy and the flow characteristics.

According to another non-limiting embodiment, a method is provided to determine exhaust emissions and reduce contrail formation produced by an aircraft. The method comprises exhausting a mass flow from a gas turbine engine of the aircraft; determining, by an optically-based contrail control system, an amount of scattered energy caused by the energy interacting with particulates contained in the second mass flow; and determining, by the optically-based contrail control system, flow characteristics of the second mass flow based at least in part on molecular components contained in the second mass flow. The method further comprises determining, by the optically-based contrail control system, a level of emissions exhausted from the gas turbine engine based at least in part on a combination of the amount of scattered energy and the flow characteristics.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

The current methods for measuring jet engine exhaust emissions during flight operations requires either a chase aircraft measuring emissions or for an aircraft to tow a set of measurement devices. In both cases, however, point measurements are used which limit the information obtained. In addition, relying on Filtered Rayleigh Scattering (FRS) to detect exhaust particulates has previously been considered impractical because FRS produced a weak signal that contained signal noise which needs filtering in order to obtain practical emission measurements.

Various non-limiting embodiments described herein provide an optically-based contrail control system capable of controlling the aircraft engine to reduce contrail formation produced by the engine. In one or more non-limiting embodiments, the optically-based contrail control system employs a FRS measuring scheme, which provides the ability to determine flow characteristics such as velocity, density, temperature, and pressure from molecular components (e.g., oxygen, nitrogen and/or water) that can be coupled with background scattering from particulates (e.g., soot, particulate emissions, products of combustion, etc.) to quantify engine exhaust emissions.

The optically-based contrail control system is beneficial over conventional aircraft engine exhaust emission measurement schemes because the FRS measuring scheme does not require probes and can be used to measure areas of the engine without any additional mechanical components. The FRS measuring scheme also allows for performing planar measurements instead of single point measurements, which achieves more precise distributions to be generated without missing high concentration areas that can result from improper probe placement. In addition, the optically-based contrail control system described herein can be used during real-time flight missions in order to evaluate engine performance in terms of emission and possible contrail formation as a function of attitude and flight conditions as well as ground-based testing. The optically-based contrail control system can also be extended to any non-contact measurement system which can separate molecular scattering information from associated particle scattering and can be a derivate of FRS measuring technique.

Figure 1:
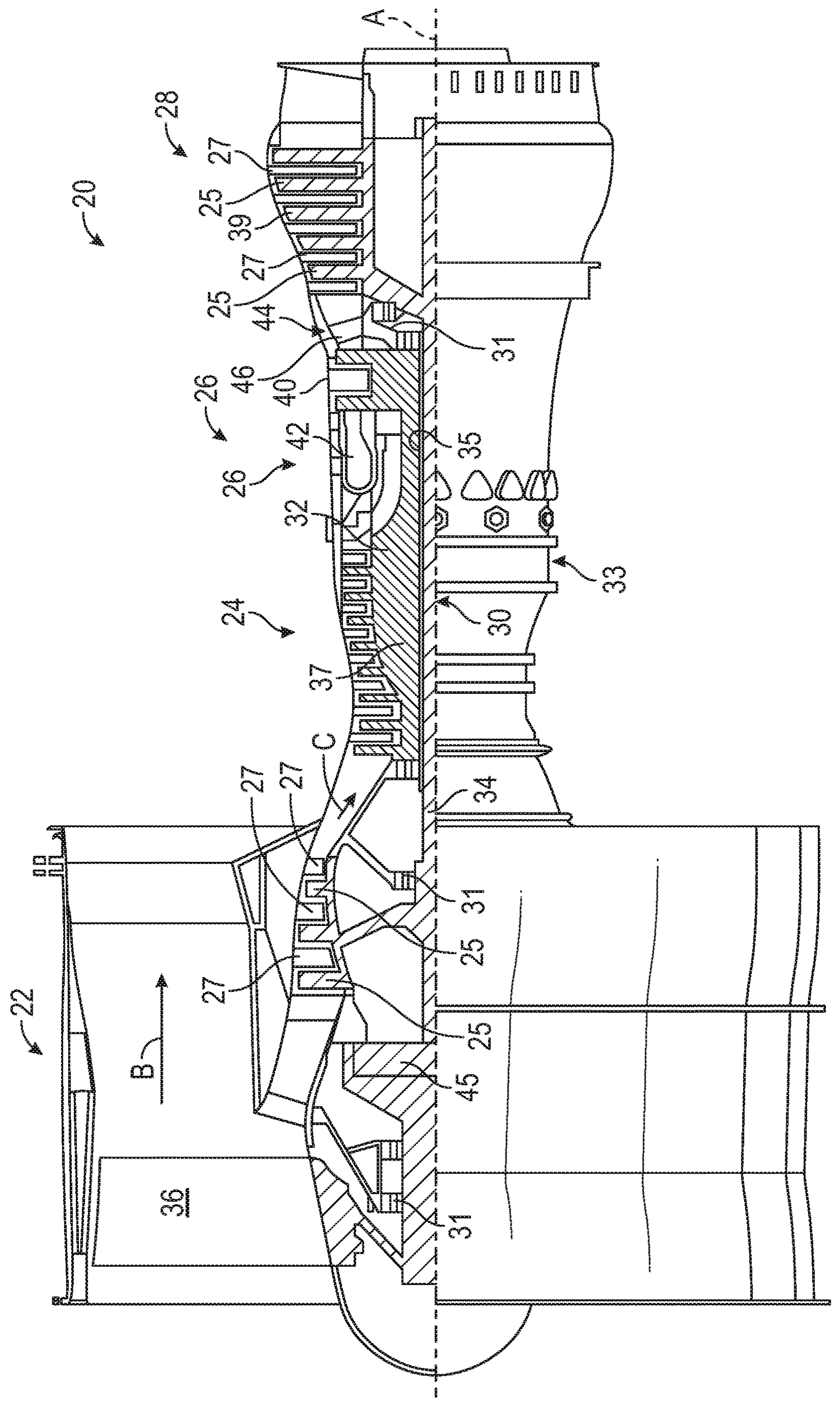
FIG. 1 is a schematic cross-sectional illustration of a gas turbine engine architecture that may employ various embodiments disclosed herein.

With reference now to FIG. 1, a gas turbine engine 20 schematically illustrated according to a non-limiting embodiment of the present disclosure. As an example, the gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section

26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42, and is then expanded over the high-pressure turbine 40 and the low-pressure turbine 39. The high-pressure turbine 40 and the low-pressure turbine 39 rotationally drive the respective high-speed spool 32 and the low-speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration. For example, the teachings provided herein may be applied to other types of engines. Some such example alternative engines may include, without limitation, turbojets, turboshafts, and other turbofan configurations (e.g., wherein an intermediate spool includes an intermediate pressure compressor ("IPC") between a low-pressure compressor ("LPC") and a high-pressure compressor ("HPC"), and an intermediate pressure turbine ("IPT") between the high-pressure turbine ("HPT") and the low-pressure turbine ("LPT").

Figure 2:
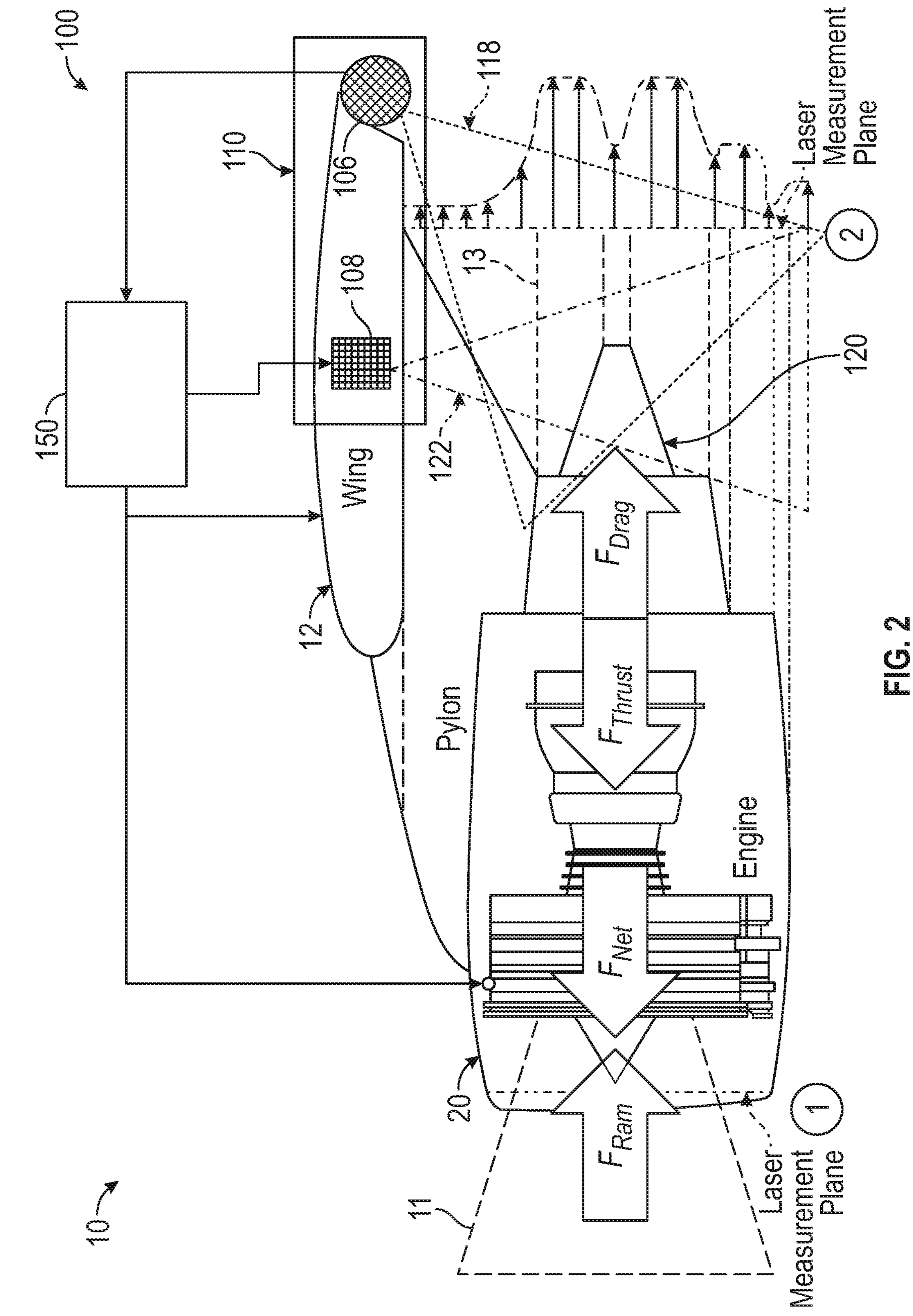
FIG. 2 depicts an aircraft including an optically-based contrail control system according to a non-limiting embodiment of the present disclosure.

Turning now to FIG. 2, an aircraft 10 including an optically-based contrail control system 100 (hereinafter referred to as "a control system") is illustrated according to a non-limiting embodiment of the present disclosure. The aircraft 10 includes a gas turbine engine 20 configured to ingest a first mass flow 11 and to exhaust a second mass flow 13 (e.g., exhaust gas).

The optically-based contrail control system 100 is configured to determine an amount of scattered energy caused by the energy interacting with particulates contained in the second mass flow 13, and to determine flow characteristics of the second mass flow 13 based at least in part on molecular components contained in the second mass flow 13. The flow characteristics can include, but are not limited to, a velocity, density, temperature, and pressure. The molecular components can include, but are not limited to, oxygen, nitrogen, and water. Based at least in part on a combination of the amount of detected scattered energy and the flow characteristics, the optically-based contrail control system 100 can determine a level of emissions exhausted from the gas turbine engine 20.

The optically-based measurement system 100 includes an optical sensing unit 110 and a controller 150. The optical sensing unit 110 is configured to detect the scattered energy caused by energy interacting with particulates contained in the second mass flow 13 (i.e., the engine exhaust). The controller 150 is in signal communication with the optical sensing unit 110. The controller 150 is configured to determine the level of emissions exhausted from the gas turbine engine 20 and to adjust the at least one operating parameter of the aircraft 10 to reduce the level of emissions and/or to reduce the formation of contrails produced by the gas turbine engine 20. The operating parameters can include, but are not limited to, thrust, airspeed, pitch (e.g., Elevator position, trimming), etc., which can change the flight path and/or altitude of the aircraft 10.

The optical sensing unit 110 includes an energy source 106 and an optical sensor 108. The energy source 106 is configured to direct the energy into the second mass flow 13. In one or more non-limiting embodiments, the energy source 106 is a laser capable of emitting laser energy. The optical sensor 108 is configured to detect the amount of scattered energy caused by the energy (e.g., laser energy) interacting with particulates contained in the second mass flow 13.

The optical sensing unit 110 and the controller 150 can operate together to perform FRS measuring scheme, which determines the amount of energy scattering caused by the interaction of the energy with emissions particulates (e.g., soot, particulate emissions, products of combustion, etc.). As described above, the energy source 106 can be implemented as a laser 106. Accordingly, the controller 150 outputs a control signal that drives the laser 102 to output laser energy 118 toward the aft or rear region 120 according to a set frequency and/or wavelength. During the flight of the aircraft 10, the laser energy 112 (e.g. photons) interacts with particles of the second mass flow 13 (e.g., exhaust gas) to produce an inflow Rayleigh/Mie scattering effect occurring at the aft or rear region 120 of the engine 20. Although a laser unit 106 is described it should be appreciated that other types of energy sources capable of directing energy that can be sensed thereat can be employed without departing from the scope of the invention.

The optical sensor 108 is coupled to the aircraft 10 and has a field of view (FOV) 122 that captures the aft or rear region 122. The optical sensor 108 can be constructed as a spectrally-sensitive camera; however, other types of optical sensors can be employed. Although a single optical sensor 108 is illustrated, it should be appreciated that additional optical sensors can be installed without departing from the scope of the invention. The additional optical sensors can provide improved spatial coverage and improved sensitivity of the measurements (e.g., velocity, temperature, density and/or pressure). The inflow Rayleigh/Mie scattering effect causes a laser scattering of molecules (e.g., spectrum of light) that produces an outflow energy spectrum (e.g., a spectrum of light) and an Rayleigh scattering distribution, which can be detected by the optical sensor 108. In one or more non-limiting embodiments, the laser 106 probes and out-flow plane of the aft or rear region 13 rather than a single point, and the optical sensor 108 scans the laser probe planes to obtain velocity and density measurements from the spectrum of light scattered by flow gas molecules.

The controller 150 can process the outflow energy spectrum to determine an outflow temperature value (e.g., a local static fluid temperature) (T2) and an outflow density value (e.g., local static fluid density) ($\rho 2$) at each point produced according to the output of the optical sensor 108 and associated with the aft or rear region 120 of the gas turbine engine 20. The controller can further apply a Doppler shift to the output energy spectrum to determine an outflow velocity magnitude value (U2) (e.g., a velocity magnitude normal to a control volume surface of the engine 20) at each point produced according to the output of the optical sensor 108 associated with the aft or rear region 120. As described herein, the controller 150 can process the outflow energy spectrum by comparing it to one or more stored spectrum models, and then extracting the outflow temperature value (T2), the outflow density value ($\rho 2$), and the outflow velocity magnitude value (U2) that defines a matching spectrum model. In or more non-limiting embodiments, the extracted outflow temperature value (T2), outflow density value ($\rho 2$), and/or outflow velocity magnitude value (U2) that defines the matching spectrum model is indicative of real-time exhaust emissions and/or contrail production produced by the aircraft engine.

The controller 150 can also process the optically captured energy spectrum to quantify engine exhaust emissions. The Mie scattering, which is a background effect of the FRS measurement, provides information that can be used to measure particles that have a similar size to or larger than the wavelength of the FRS laser. This information can also be used to determine particle count and composition of non-molecular items in the flow that are a product of combustion, soot, sand, dirt, and small particles from the shedding of engine coating material. For example, particle count and composition of non-molecular items information can be determined by changing the direction and wavelengths of the FRS laser and optical measurement system to be sensitive to these particles while making the FRS measurement.

According to one or more non-limiting embodiments, the optically-based contrail control system 100 can perform one or more emission reduction actions based at least in part on the level of emissions exhausted from the gas turbine engine 20. For example, the controller 150 can control at least one aircraft operating parameter of the aircraft 10 to reduce the level of emissions and/or to reduce, or even completely prevent, the formation of contrails. In one or more non-limiting embodiments, the controller 150 can control an operating parameter of the aircraft 10 the aircraft 10 to increase the altitude to a level where the atmosphere is drier and less likely to form persistent contrails. In another example, the controller 150 can guide the aircraft 10 into a flight path that contains a reduced level of humidity or water vapor such that contrails are less likely to form, or even prevents contrails from forming. In another non-limiting embodiment, the controller 150 can generate a maintenance alert to perform one or more maintenance operations (e.g., utilizing different fuel types, engine tuning, etc.) that can reduce particulate emissions and/or contrail formation.

Figure 3:
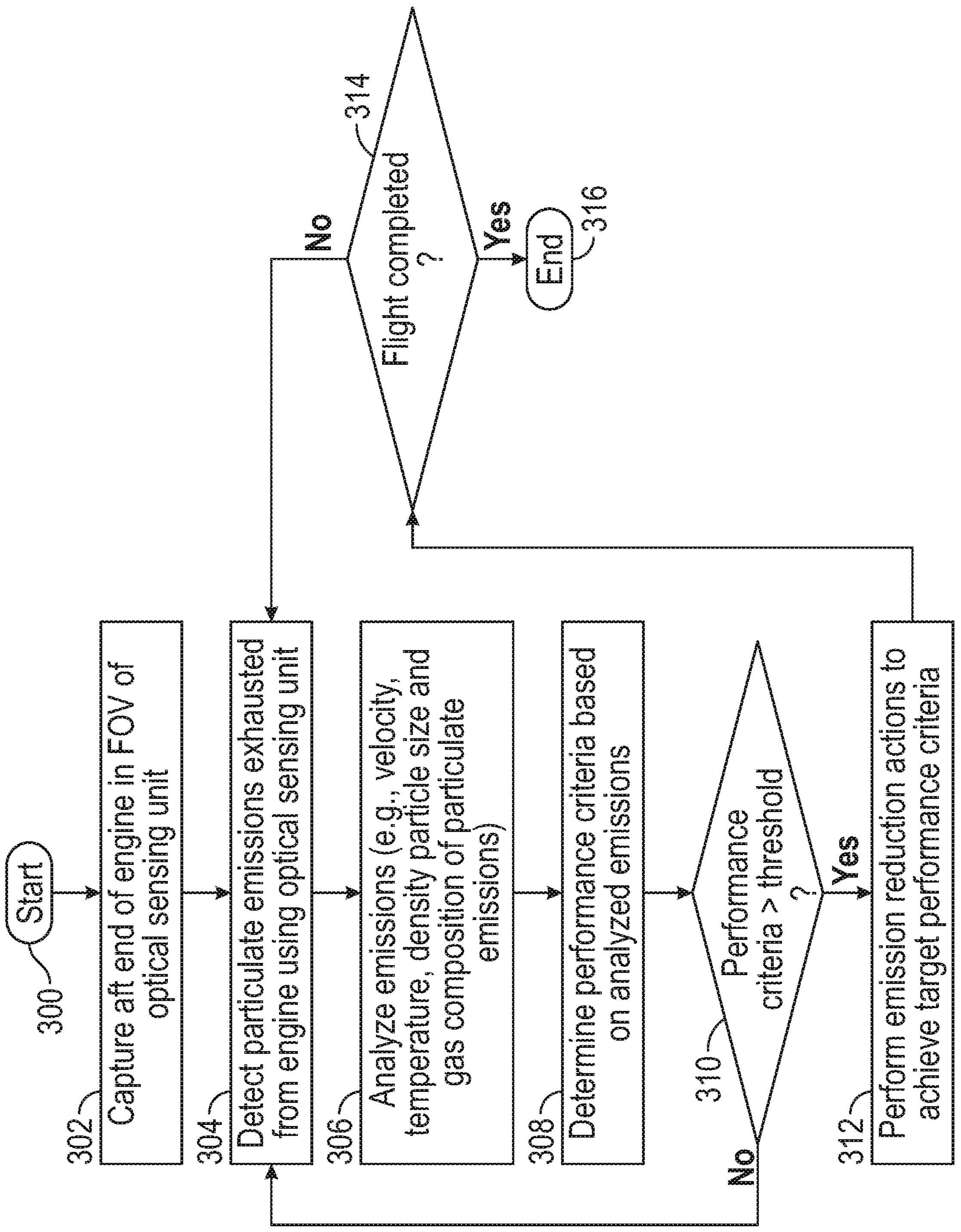
FIG. 3 illustrates a flow diagram illustrating a method of determining exhaust emissions and reducing contrail formation produced by an aircraft engine according to a non-limiting embodiment of the present disclosure.

Referring to FIG. 3, a method of determining exhaust emissions and reducing contrail formation produced by an aircraft engine is illustrated according to a non-limiting embodiment of the present disclosure. The method begins at operation 300, and at operation 302 an aft end (e.g., rear region) of an aircraft engine is captured in a field of view (FOV) of an optical sensing unit. At operation 304, the optical sensing unit detects particulate emissions exhausted from the engine. At operation 306, the detected particulate emissions are analyzed (e.g., via a controller). The analysis of the particulate emissions includes, for example, analyzing the particulate exit velocity from the engine, exhaust gas temperature, exhaust gas composition, and particulate density and/or size. In one or more non-limiting embodiments, the particulate emissions analysis can be performed at set time intervals. For example, the particulate emissions analysis can be performed every 30 minutes. It should be appreciated, however, that other time internals can be utilized without departing from the scope of the present disclosure.

At operation 308, a real-time performance criteria is determined based on the analyzed particulate emissions. In one or more non-limiting embodiments, the performance criteria includes a determined concentration of different gas compositions and the amount or density of detected particulates. At operation 310, the real-time performance criteria is compared to a target performance criteria threshold. For example, the detected amount of particulate emissions can be compared to a emissions threshold set to achieve a minimum amount of exhausted particulate emissions The target performance criteria can also include an emissions threshold set to form a minimum amount of contrails, or even completely prevent the formation of contrails.

When the performance criteria exceeds the target performance threshold (e.g., when an amount of particulate emissions exhausted from the engine exceeds an emissions threshold), the method returns to operation 304 and continues detecting the particulate emissions exhausted from the engine. When, however, the performance criteria is less than or equal to the target performance threshold, one or more emission reduction actions are performed at operation 312. The emission reduction actions can include, for example, controlling various operating parameters of the aircraft and/or engine to reduce particulate emissions output and/or reduce or event prevent the formation of contrails. For example, aircraft flight parameters can be controlled and adjusted so that that the aircraft altitude is increased to achieve higher altitudes where the atmosphere is drier and less likely to form persistent contrails. In another example, the aircraft flight path can be controlled and adjusted into a flight path that contains a reduced level of humidity or water vapor such that contrails are less likely to form. The emission reduction actions may also include performing various maintenance operations such as utilizing different fuel types or other maintenance operations that can reduce particulate emissions and/or contrail formation.

At operation 314, a determination is made as to whether the flight mission of the aircraft is complete. When the flight mission is not complete (i.e., still on-going), the method returns to operation 304 and continues detecting the particulate emissions exhausted from the engine. When, however, the flight mission is complete and the aircraft is ground, the method ends at operation 316.

As described herein, various non-limiting embodiments described herein provide an optically-based contrail control system capable of controlling the aircraft engine to reduce contrail formation produced by the engine. In one or more non-limiting embodiments, the optically-based contrail control system employs a FRS measuring scheme, which provides the ability to determine flow characteristics such as velocity, density, temperature, and pressure from molecular components (e.g., oxygen, nitrogen and/or water) that can be coupled with background scattering from particulates (e.g., soot, particulate emissions, products of combustion, etc.) to quantify engine exhaust emissions.

As used herein, the terms “about” and “substantially” are intended to include the degree of error associated with measurement of the particulate quantity based upon the equipment available at the time of filing the application. For example, the terms may include a range of ±8%, or 5%, or 2% of a given value or other percentage change as will be appreciated by those of skill in the art for the particulate measurement and/or dimensions referred to herein.

The terminology used herein is for the purpose of describing particular embodiments only and is not intended to be limiting of the present disclosure. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as “forward,” “aft,” “upper,” “lower,” “above,” “below,” “radial,” “axial,” “circumferential,” and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. An aircraft comprising:

a gas turbine engine configured to ingest a first mass flow and to exhaust a second mass flow; and an optically-based contrail control system configured to determine an amount of scattered energy contained in the second mass flow, to determine flow characteristics of the second mass flow based at least in part on molecular components contained in the second mass flow, and to determine a level of emissions exhausted from the gas turbine engine based at least in part on a combination of the amount of scattered energy and the flow characteristics, wherein the optically-based contrail control system compares the level of emissions to an emissions threshold set to form a target amount of contrails and wherein the optically-based contrail control system performs at least one emission reduction action in response to the level of emissions exceeding the emissions threshold.

2. The aircraft of claim 1, wherein the at least one emission reduction action includes at least one of controlling at least one operating parameter of the aircraft to reduce at least one of the level of emissions exhausted from the gas turbine engine and a formation of contrails produced by the gas turbine engine.

3. The aircraft of claim 1, wherein the emissions threshold is set to achieve a minimum amount of exhausted particulate emission, and wherein the flow characteristics includes one or a combination of velocity, density, temperature, and pressure.

4. The aircraft of claim 1, wherein the molecular components include one or a combination of oxygen, nitrogen, and water.

5. The aircraft of claim 1, wherein the optically-based measurement system comprises:

an optical sensing unit configured to detect the scattered energy; and a controller in signal communication with the optical sensing unit, the controller configured to determine the level of emissions and to adjust the at least one operating parameter of the aircraft to reduce at least one of the level of emissions exhausted from the gas turbine engine and the formation of contrails produced by the gas turbine engine.

6. The aircraft of claim 5, wherein the optical sensing unit comprises:

an energy source configured to direct energy into the second mass flow; and an optical sensor configured to detect the amount of scattered energy caused by the energy interacting with particulates contained in the second mass flow.

7. The aircraft of claim 6, wherein the energy source directs the energy at a target area; and wherein the optical sensor, senses an energy spectrum at the target area resulting from the energy.

8. The aircraft of claim 7, wherein the energy source is coupled to a body of the aircraft and is remotely located from the gas turbine engine.

9. The aircraft of claim 7, wherein the energy source is disposed within an inlet of the gas turbine engine.

10. A method of determining exhaust emissions and reducing contrail formation produced by an aircraft, the method comprising:

exhausting a mass flow from a gas turbine engine of the aircraft;

determining, by an optically-based contrail control system, an amount of scattered energy caused by the energy interacting with particulates contained in the mass flow;

determining, by the optically-based contrail control system, flow characteristics of the mass flow based at least in part on molecular components contained in the mass flow;

determining, by the optically-based contrail control system, a level of emissions exhausted from the gas turbine engine based at least in part on a combination of the amount of scattered energy and the flow characteristics;

comparing the level of emissions to an emissions threshold set to form a target amount of contrails; and performing at least one emission reduction action in response to the level of emissions exceeding the emissions threshold.

11. The method of claim 10, wherein the at least one emission reduction action includes at least one of:

controlling at least one operating parameter of the aircraft to reduce at least one of the level of emissions exhausted from the gas turbine engine; and controlling a formation of contrails produced by the gas turbine engine.

12. The method of claim 10, wherein the flow characteristics includes one or a combination of velocity, density, temperature, and pressure.

13. The method of claim 10, wherein the molecular components include one or a combination of oxygen, nitrogen, and water.

14. The method of claim 10, further comprising:

detecting, by an optical sensing unit, the scattered energy;

determining, by a controller, the level of emissions; and adjusting, by the controller, the at least one operating parameter of the aircraft to reduce at least one of the level of emissions exhausted from the gas turbine engine and the formation of contrails produced by the gas turbine engine.

15. The method of claim 14, further comprising:

directing, by an energy source, the energy into the mass flow; and an optical sensor configured to detect the amount of scattered energy caused by the energy interacting with particulates contained in the mass flow.

16. The method of claim 15, further comprising:

directing, via the energy source, energy at a target area of the mass flow; and sensing, via the optical sensor, an energy spectrum at the target area resulting from the energy interacting with particulates contained in the mass flow.

17. The method of claim 16, further comprising directing from the energy source that is coupled to a body of the aircraft and is remotely located from the gas turbine engine.

18. The method of claim 16, further comprising directing the energy from the energy source that is disposed within an inlet of the gas turbine engine.

* * * * *